United States Patent

[11] 3,560,654

[72] Inventor Sidney Darlington
Passaic Township, Morris County, N.J.
[21] Appl. No. 802,142
[22] Filed Feb. 25, 1969
[45] Patented Feb. 2, 1971
[73] Assignee Bell Telephone Laboratories, Incorporated
Murray Hill, N.J.
a corporation of New York

[54] MODULATION AND DEMODULATION APPARATUS USING REFERENCE TIME FUNCTIONS
15 Claims, 7 Drawing Figs.

[52] U.S. Cl. .......... 179/15, 325/137, 325/330, 329/50, 332/45
[56] No References Cited.
[51] Int. Cl. .......... H04j 3/04
[50] Field of Search .......... 325/340, 50, 136, 137; 329/50, 164; 332/40, 44, 45; 179/15SSB, 15OR

*Primary Examiner*—Kathleen H. Claffy
*Assistant Examiner*—David L. Stewart
*Attorneys*—R. J. Guenther and William L. Keefauver

ABSTRACT: A single-sideband modulator and demodulator are realized by using reference time functions. The desired modulated or demodulated signals are generated by modulating and filtering a train of pulses of constant amplitude to develop a reference time function which, in turn, is scaled in accordance with sampled values of an applied baseband or modulated signal.

INVENTOR
S. DARLINGTON
BY Gerard E. Murphy
ATTORNEY

MODULATION AND DEMODULATION APPARATUS USING REFERENCE TIME FUNCTIONS

BACKGROUND OF THE INVENTION

1. Field of the Invention

This invention pertains to modulation and demodulation apparatus and, more particularly, to single-sideband modulation and demodulation systems.

Fundamental to the communication of information is efficiency of transmission, whether measured in terms of bandwidth, power required, complexity of the circuitry of other applicable criteria. Efficiency of transmission necessitates that the information to be communicated to a distant point be processed before transmission over an intervening medium. In terms of modern communications, signal processing comprises modulation and, of course, demodulation, in one form or another, of an information bearing signal. Modulation not only makes transmission possible at frequencies higher than the frequencies of the information bearing components of the applied signal, but also permits frequency multiplexing, i.e., staggering of frequency components over a specified frequency spectrum.

It is well known that the process known as amplitude modulation is wasteful of signal spectrum, since transmitting both sidebands of a modulated signal requires double the bandwidth needed for only one sideband, and is wasteful of power, particularly since the transmitted carrier conveys no information. Thus, as the useful frequency spectrum has become congested, resort has been made to a form of modulation, i.e., single-sideband, where only one sideband, as the name implies, is transmitted. Of course, to maximize efficiency of transmission, the manner in which the single-sideband modulated signal is generated must be made as efficient and economical as is technologically possible. Particularly is this true in those large frequency multiplex systems where thousands, if not tens of thousands, of single-sideband modulators are utilized. 2. Description of the Prior Art Conventional single-sideband modulators and demodulators rely upon the use of either lowpass or band-pass filters to properly exclude undesirable signals. In classical communication engineering, highly frequency selective circuits, such as the filters referred to, are constructed from the basic building blocks of resistors, capacitors and inductors. While it is feasible and advantageous to develop resistors and capacitors in inexpensive microminiaturized thin film or solid state form, the same is not true for inductors or their equivalents. Inductive elements are not only expensive, but are also bulky items relative to the size of microminiaturized components. Thus, systems engineers have been stymied in their search to economize and make more efficient the process of single-sideband modulation and demodulation. Since inductors do not lend themselves to realization by economical circuit technologies the object of this invention is to minimize their use by substantially reducing the number of filters employed in single-sideband systems.

SUMMARY OF THE INVENTION

In accordance with the principles of this invention, this object and other objects are accomplished by using reference time functions to develop the desired modulated and demodulated signals. More particularly, a train of reference pulses of constant amplitude and separated by a predetermined interval of time is applied to a conventional product modulator wherein a modulation product signal is formed with an applied modulating carrier signal. The undesired sideband and carrier signals of the product signal are removed by filtering to develop a reference time function signal.

The output due to an applied pulse is represented by a complicated time function but the amplitude of the time function is directly related to the amplitude of the applied pulse. Accordingly, the output due to an individual sample pulse of an applied baseband signal may be expressed as the product of a reference time function and a scale factor. Thus, the baseband signal to be modulated is sampled and the sample values are utilized to alter the amplitude of the generated reference time function. In some cases, a plurality of reference time functions must be generated; however, the required number of filters used to generate the functions is substantially less than the required number of filters utilized in conventional multichannel frequency systems. Accordingly, great savings are realized by the practice of this invention.

Since the process of demodulation may be likewise expressed as the product of a reference time function and a scale factor, the principles of this invention are also applicable to demodulation systems.

DETAILED DESCRIPTION OF THE INVENTION

In a conventional single-sideband (SSB) modulator, an applied analogue signal is modulated with a carrier signal to develop a modulation product signal. The unwanted carrier and sideband signals of the modulation product signal are removed by filtering, thus leaving only the desired sideband signal. A different scheme, in accordance with the principles of this invention, is illustrated in FIG. 1.

In order to understand the operation of the instant invention, suppose the continuous baseband signal input of a conventional single-sideband modulator is replaced by a sampled version, i.e., by a sequence of sample pulses that satisfy the well-known Nyquist criterion. Because the conventional single-sideband modulator is linear in the signal, the output signal thereof may be regarded as the sum of the outputs due to the individual input sample pulse; thus, the resultant output signal is substantially the same as that developed by a conventional modulator. The output due to each applied sample pulse is represented by a complicated time function which lasts a relatively long time; however, the amplitude of the output time function is directly related to the amplitude of the applied sample pulse by a constant scale factor. Accordingly, the output S $(t)$ due to an individual applied sample pulse at time $t$ may be expressed as $$S(t)=\frac{H}{H_0}S_0(t) \qquad (1)$$

where H is the amplitude of the applied sample pulse and $S_O(t)$ is the reference time function output due to a reference sample pulse of standard predetermined amplitude $H_O$.

Figure 1:
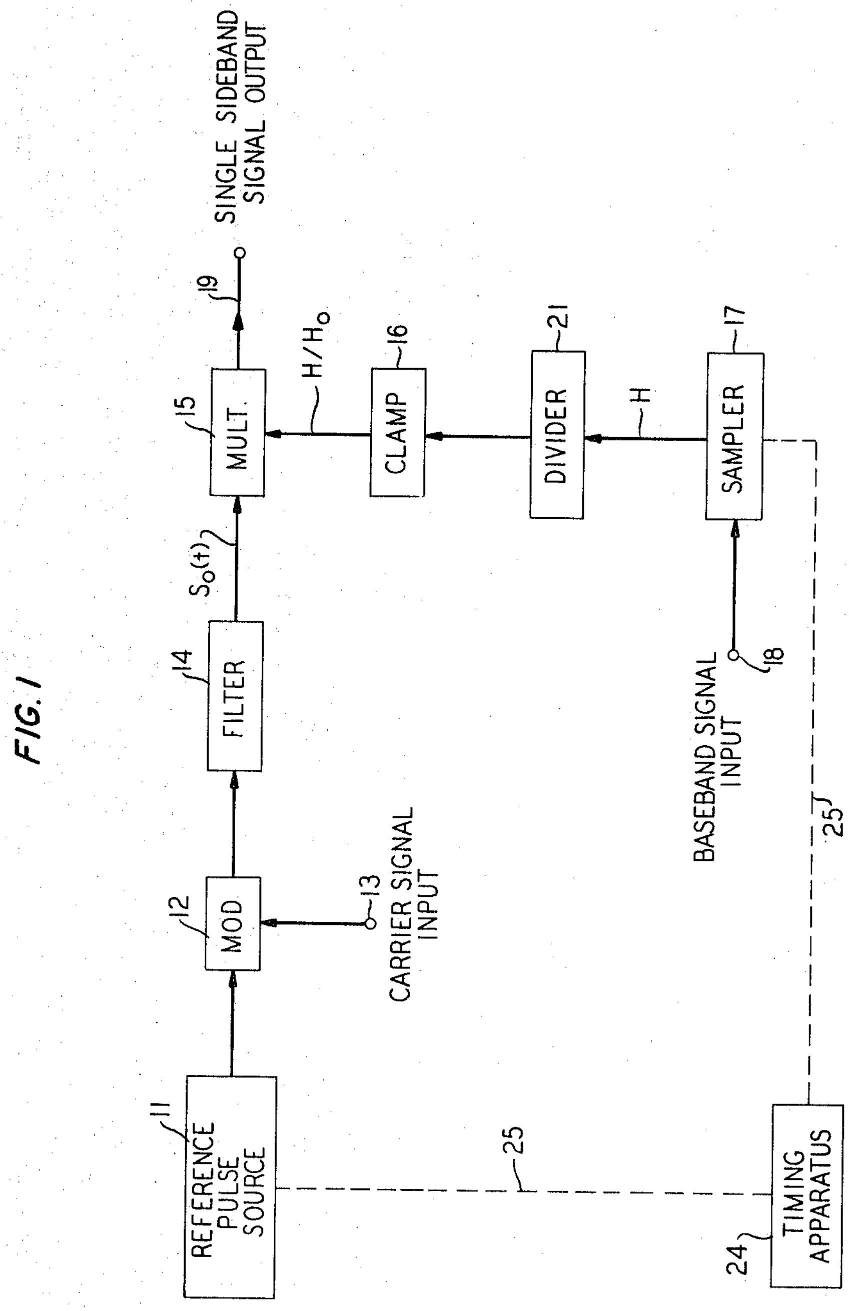
FIG. 1 is a block diagram of the single-sideband modulator of this invention.

In FIG. 1, pulse source 11 develops a train of reference pulses of constant amplitude, $H_O$, separated by a pulse interval, T, which is applied to a conventional product modulator 12. A modulating carrier signal of frequency $w_c$, generated by any well-known apparatus, is applied via terminal 13 to modulator 12 developing at the output thereof an amplitude modulated signal. The undesired sideband (e.g., the lower sideband) and carrier signals are removed by filter 14 to develop reference signal $S_O$ $(t)$. Simultaneously with the application of each reference pulse to modulator 12, the baseband signal to be modulated, bandlimited to a frequency $w_O$ and applied at terminal 18, is sampled by apparatus 17 at intervals of time, T, consonant with the Nyquist criterion. Pulse source 11 and sampler 17 are each controlled by timing apparatus 24 in a conventional manner, as indicated by dashed lines 25. Sampler 17 may be of any well-known construction. The sampled values, H, of the baseband signal are applied via divider circuit 21 to clamp circuit 16. Divider circuit 21 introduces a scale factor of $1/H_O$ in accordance with equation (1); of course, attenuation by a scale factor $1/H_O$ is readily incorporated into clamp circuit 16. Accordingly, in the further illustrations of this invention it will be assumed that the scaling function of divider circuit 21 is included in the depicted clamp circuits. If $H_O$ has unity value, scaling is, of course, not necessary. Clamp circuit 16 stores a signal proportional to $H/H_O$ during each sampling interval, T, and applies the same to multiplier 15. The desired single-sideband product signal, in accordance with equation (1), is available at terminal 19 of multiplier 15. It will be recognized by those skilled in the art that a conventional sample and hold circuit may replace apparatus 16, 17, and 21.

Depending upon the impulse response of filter 14, the possibility exists that the response $S_O$ to a single pulse of the train emanating from source 11 will last for a number of sampling intervals, T. If this occurs, the signal responses at the output of filter 14 will overlap in time, thereby introducing undesirable distortion. The modulation apparatus of FIG. 2 overcomes this problem. Assuming that the impulse response of filter 14 is insignificant outside an interval of time $t_1$ *to* $t_2$, then no overlapping will occur if the applied pulses are separated by n sampling intervals, T, where $$n=\frac{t_2-t_1}{T} \quad (2)$$

Figure 2:
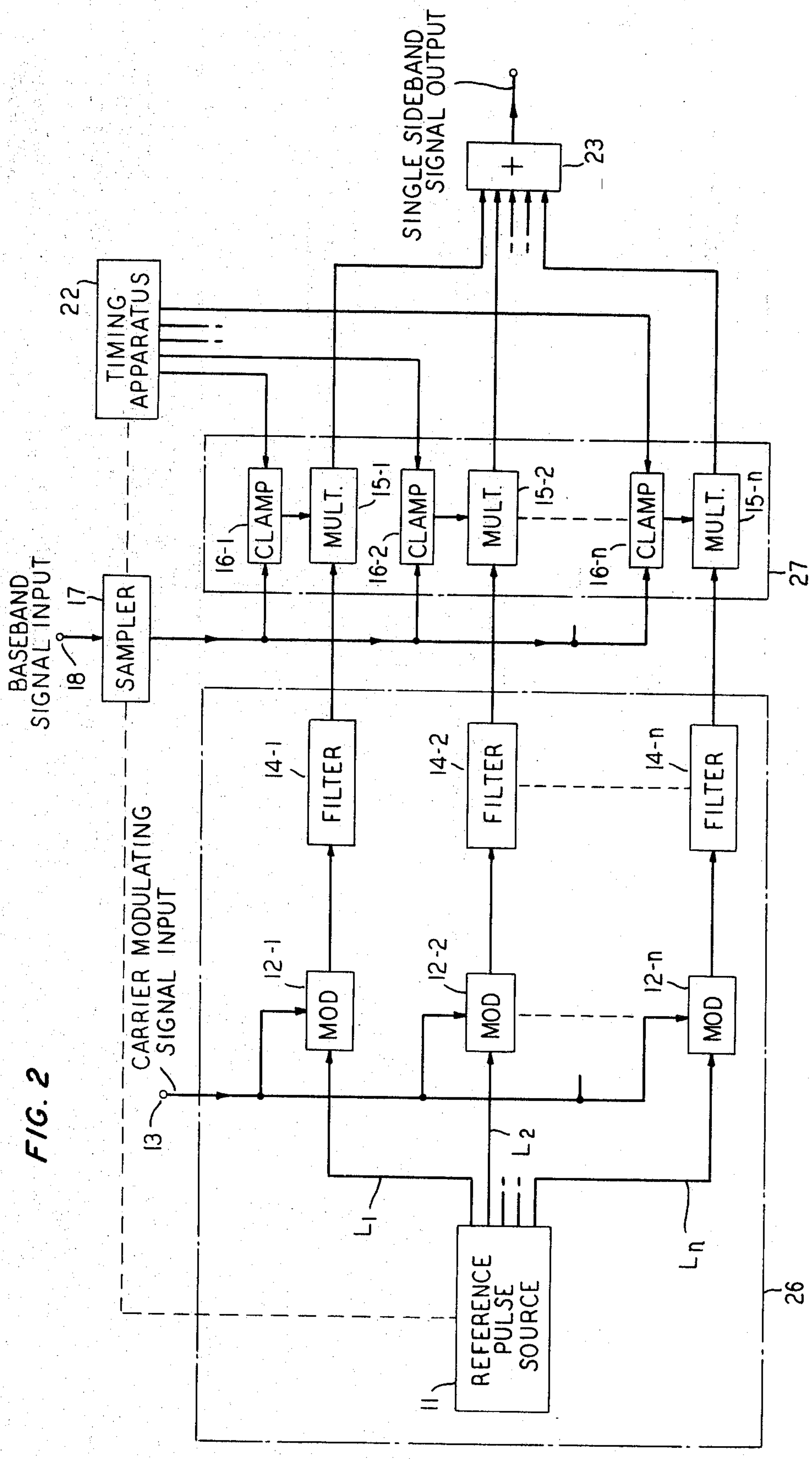
FIG. 2 is a block diagram of a single-sideband modulator utilizing a plurality of reference time functions in accordance with the principles of this invention.

Pulse source 11 of FIG. 2 therefore develops a plurality of pulse trains $\sum_{m=1}^{\infty} H_O(t-mnt)$, $\sum_{m=1}^{\infty} H_O[t-(mn+1)T]$,— $\sum_{m=1}^{\infty} H_O[t(mn+n-1)T]$which appear, respectively, on lines L1, L2,— L*n*. Thus, each pulse of each pulse train appearing on the lines L1, L2,— L*n* is separated from adjacent pulses on the same line by *n* sampling intervals, T. Consider, e.g., that a pulse is initiated on line L1 at a predetermined reference time. One sampling interval, T, later a pulse will occur on line L2, and two sampling intervals later a pulse will appear on line L3, etc. Finally, *n*-1 sampling intervals later a pulse appears on line L*n*. after *n* sampling intervals, a pulse again appears on line L1 and the problem of overlapping is thus obviated since adjacent pulses on each line are separated by an interval of time *T*.

Analogous to the operation of the apparatus of FIG. 1, the described pulse trains are applied to a plurality of modulators 12–1 to **12–*n* to develop a plurality of modulation product signals with a carrier signal of frequency $w_c$, applied at terminal 13. Filters 14–1 to 14–*n* delete the unwanted sideband and carrier signals of the product signals and apply the resultant reference time function signals to a plurality of multiplier circuits 15–1 to 15–*n*. It is to be understood that each reference time function signal developed at the output of each of filters 14 is identical, except for a shift in time, to the reference signal developed by the apparatus of FIG. 1. For future reference and identification, the reference time function generating apparatus is embraced within block 26**.

Simultaneous with the above-described operation, a baseband signal having a maximum frequency component $w_O$, applied at terminal 18, is sampled by apparatus 17 and the resultant sample pulses applied to clamp circuits 16–1 to **16–*n*.Clamp circuits 16 are energized sequentially at time intervals corresponding to the initiation of pulses on lines L1, L2, etc., and store the applied sample pulses from apparatus 17** for *n* sampling intervals. As described above, the resultant signal appearing at the output of any one of the clamp circuits 16 is proportional to the scale factor $H/H_O$. Thus, at the output of each multiplier circuit 15, which forms the product of a scaling signal and a reference time function signal emanating from one of filters 14, there is formed a product signal in accordance with equation (1). Combining circuit 23 forms the sum of each of these product signals to develop a composite single-sideband signal. Synchronizing timing apparatus 22, which may be of any type well known to those skilled in the art, generates a sequence of timing pulses which control clamp circuits 16, sampler apparatus 17 and reference pulse source 11, as indicated by the dashed line. For future reference and identification, clamping circuits 16 and multiplication circuits 15 are embraced by block 27.

Figure 3:
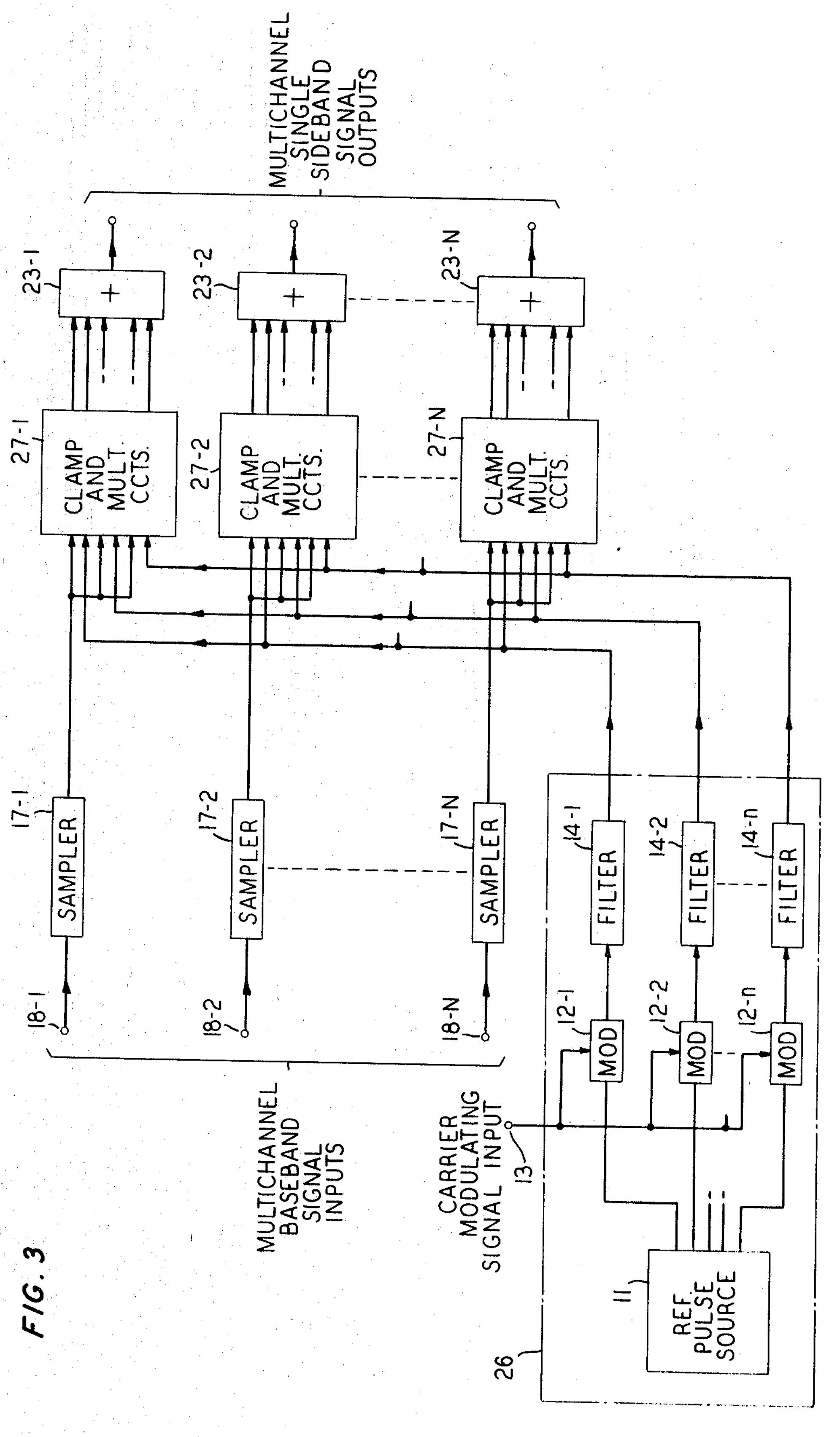
FIG. 3 is a block diagram of the multichannel single-sideband modulation system of this invention.

The advantages and features of the instant invention become even more apparent upon consideration of multichannel communication systems. In FIG. 3, for example, a plurality, N, of baseband signal inputs are to be modulated to develop a corresponding plurality, N, of single-sideband signal outputs. Since the reference time functions $S_O(t)$ developed by the modulation apparatus of FIG. 2 are truly reference or generic functions, they may be used simultaneously for more than one channel. Samples appearing at the same time on any or all of the N channels require the same reference time function; accordingly only the sampling circuits 17 and clamping and multiplication circuits 27 need be duplicated. The components of apparatus 27–1 to 27–N are identical to the components, 15–1 to **15–*n* and 16–1 to 16–*n*, of apparatus 27, depicted in FIG. 2**.

As in FIG. 2, a plurality of pulse trains are applied to a plurality of modulators 12 and filters 14 to develop a plurality of reference time functions $S_O(t)$. one of these reference time functions is applied to a multiplier circuit 15 in each of the clamp-multiplication circuit configurations 27. The baseband signals, applied respectively at terminals 18–1 to 18–N, are each sampled respectively be apparatus 17–1 to 17–N and the resultant sample pulses applied to one of the clamp-multiplication circuit configurations 27. Thus, the operation of the apparatus of FIG. 3, on a per channel basis, is identical to the operation of the system illustrated by FIG. 2, the individual signals emanating from each of the circuit configurations 27–1 to 27–N are combined in an associated adder circuit 23–1 to 23–N. In order to avoid undue confusion, timing apparatus for the system of FIG. 3 is not shown but is conventional and performs a function identical to the apparatus used in FIG. 2. Thus, in a large scale multichannel system employing perhaps 10,000 channels, only *n* filters, where *n* is the number of sampling intervals during which a reference pulse has a significant effect, instead of 10,000 filters need be used. In a typical case, *n is not larger than* 100. The resultant economies speak for themselves. On the other hand, 10,000 *n* clamp and multiplication circuits may be required, but the cost of such circuits, when realized by the new solid state circuit technologies, is insignificant in comparison with the cost of filter networks.

The principles of this invention are also applicable to systems for demodulating an applied modulated single-sideband signal. A single-sideband signal, *s*(*t*), bandlimited to a frequency range of either $w_c+w_0$ or $w_c-w_0$, depending upon which sideband is utilized, where $w_c$ is equal to a predetermined carrier frequency and $w_0$ corresponds to the maximum frequency component of the baseband signal, may be expressed as:

$$s(t)=s_0(t)\cos\left(w_c+\frac{w_0}{2}\right)+s_s(t)\sin\left(w_c+\frac{w_0}{2}\right)t \quad (3)$$

The terms $s_c(t)$ and $s_s(t)$ are low frequency time functions bandlimited to one-half the baseband bandwidth $w_0$. In a manner analogous to the methodology applied to the modulator apparatus previously described, the functions $s_c(t)$ and $s_s(t$ ) may be each represented by a sequence of reference pulses. If each sequence or train of pulses is multiplied with a sinusoidal signal which is a function of $w_c \pm \frac{W_O}{2}$, filtered, demodulated, and then combined, the resultant time function signals will be proportionate to a sample of $s_c(t)$ or $s_s(t)$. The desired output signal may be expressed as $$S(t)=\frac{H_c}{H_0}S_{c0}(t)+\frac{H_s}{H_0}S_{s0}(t) \quad (4)$$

where $H_c$ and $H_s$ are sampled values of $s_c(t)$ and $s_s(t)$, respectively, and $S_{c0}(t)$ and $S_{s0}(t)$ are the time function signals due to reference pulse signals of standard amplitude HO.

Figure 4:
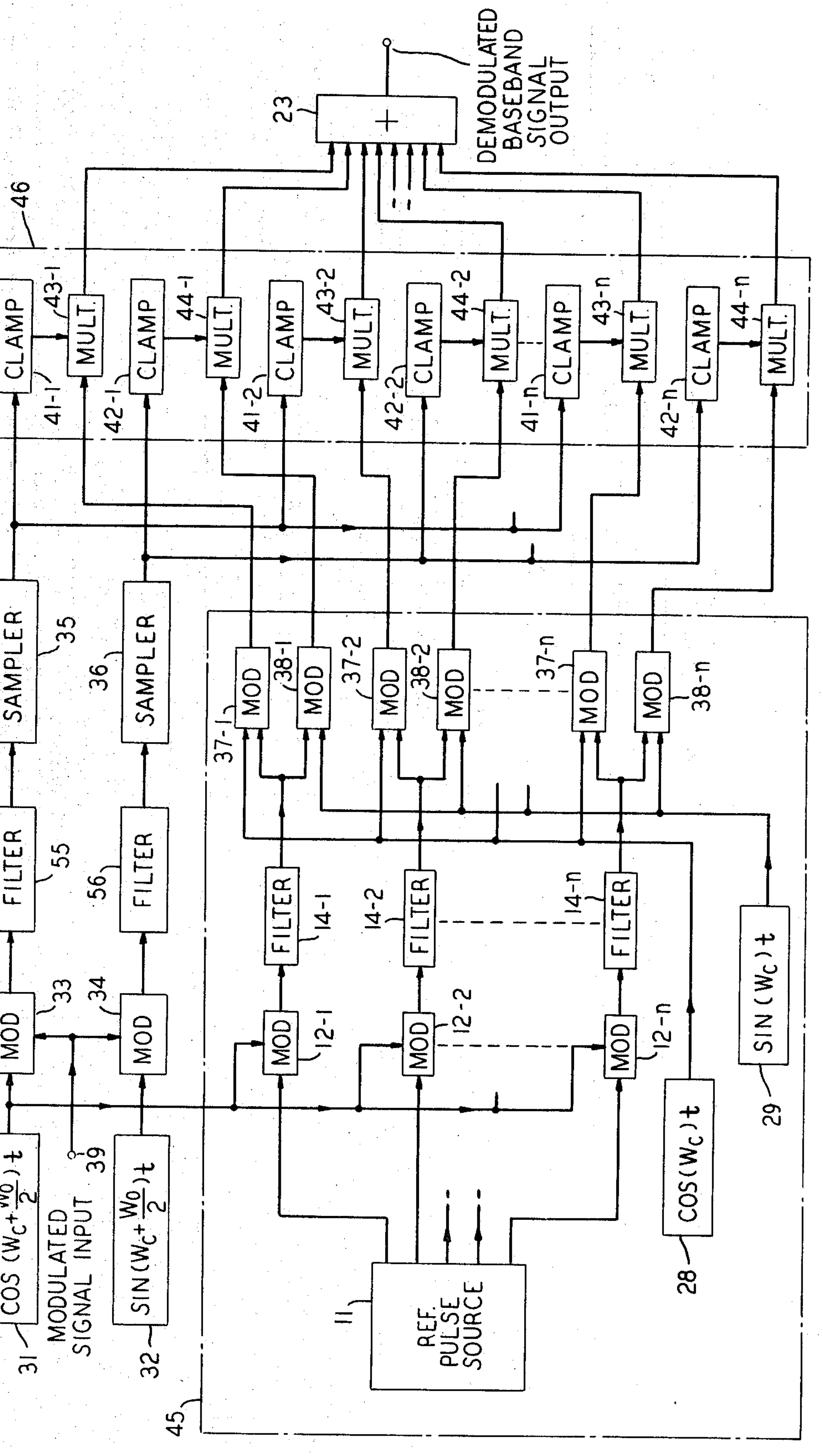
FIG. 4 depicts a demodulation system in accordance with the principles of this invention.

In the apparatus shown in FIG. 4 which, it may be noted, bears a strong resemblance to the apparatus shown in FIG. 2, reference pulse source 11 of time function generating apparatus 45 develops a plurality of pulse trains of constant amplitude, $H_0$, identical to the pulse train signals of pulse source 11 of FIG. 2. It is, of course, assumed that the impulse response of the filters, 14, utilized, as discussed above, requires a plurality of signal trains to obviate overlapping of the reference time function signals. If such is not the case, a single train of pulses may be used as shown in FIG. 1. The pulse trains are supplied to a plurality of modulators 12–1 to **12–*n* to develop a plurality of modulation product signals with an applied modulating function $\cos(w_c + \frac{W_O}{2})t$. The cosinusoidal modulating signals are supplied by oscillator 31 which may be of any well-known construction. Apparatus 14–1 to 14–*n* filters the modulation product signals to remove higher order unwanted signal components and the filtered signals are then each applied to a pair of modulators 37–1 to 37–*n* and 38–1 to 38–*n***.

A cursory examination of equation (3) would lead one to believe that it is necessary to form a product signal with a sinusoidal function $\sin(w_c + \frac{w_o}{2})t$, $w_c + w_o/2)t$, filter this signal, and then demodulate the filtered signal with a cosinusoidal function of the carrier frequency $w_c$. However, it has been found that an additional filter is not required since changing the phase of the carrier sinusoid used in demodulation has substantially the same effect as changing the phase of the input modulating sinusoid. The two reference time functions $S_{c0}(t)$ and $S_{s0}(t)$ may therefore be obtained by demodulating the output of a single filter with carrier waves $\cos w_c t$ and $\sin w_c t$, supplied to modulators 37 and 38, and generated by oscillators 28 and 29, respectively. Thus, each pair of modulators 37 and 38 develops a pair of reference time function signals $S_{c0}(t)$ and $S_{s0}(t)$ which are applied, respectively, to multipliers 43–1 to **43–*n*and 44–1 to 44–*n***.Having developed the desired reference time functions, it is next necessary to scale these functions in accordance with equation (4).

The single-sideband signal to be demodulated is applied, at terminal 39, to two circuit paths and demodulated in apparatus 33 and 34 with two sinusoidal functions $\cos(w_c + \frac{W_O}{2})t$ and $\sin(w_c + \frac{W_O}{2})t$, developed by oscillators 31 and 32. The resultant respective product signals, $s_c(t)$ and $s_s(t)$, filtered by apparatus 55 and 56 to remove extraneous signal components when so desired, are sampled, respectively, in apparatus 35 and 36 to develop sample pulses, H, proportional to the instantaneous valves of the filtered product signals. Each sample value is applied to a clamp circuit 41–1 to **41–*n* or 42–1 to 42–*n***, which stores the applied sample pulse for *n* sampling intervals in a manner identical to that of the modulation system previously disclosed. As described above, the output signals, of clamp circuits 41 and 42, which are applied to multiplier circuits 43 and 44, are proportional to the scale factor $H/H_O$. Thus, at the output of each pair of multiplier circuits, for example 43–1, 44–1, there is generated a pair of product signals in accordance with equation (4). Combining circuit 23 forms the sum of the various pairs of product signals to develop a composite baseband signal corresponding to a demodulated counterpart of the applied modulated signal. It may be helpful to note that the reference time function generating apparatus is embraced by block 45 and the clamp-multiplication circuit configuration by block 46. No timing apparatus, which may be conventional and identical to the apparatus used in the modulation system described herein, has been illustrated in order to avoid unduly complicating the drawing.

Figure 5:
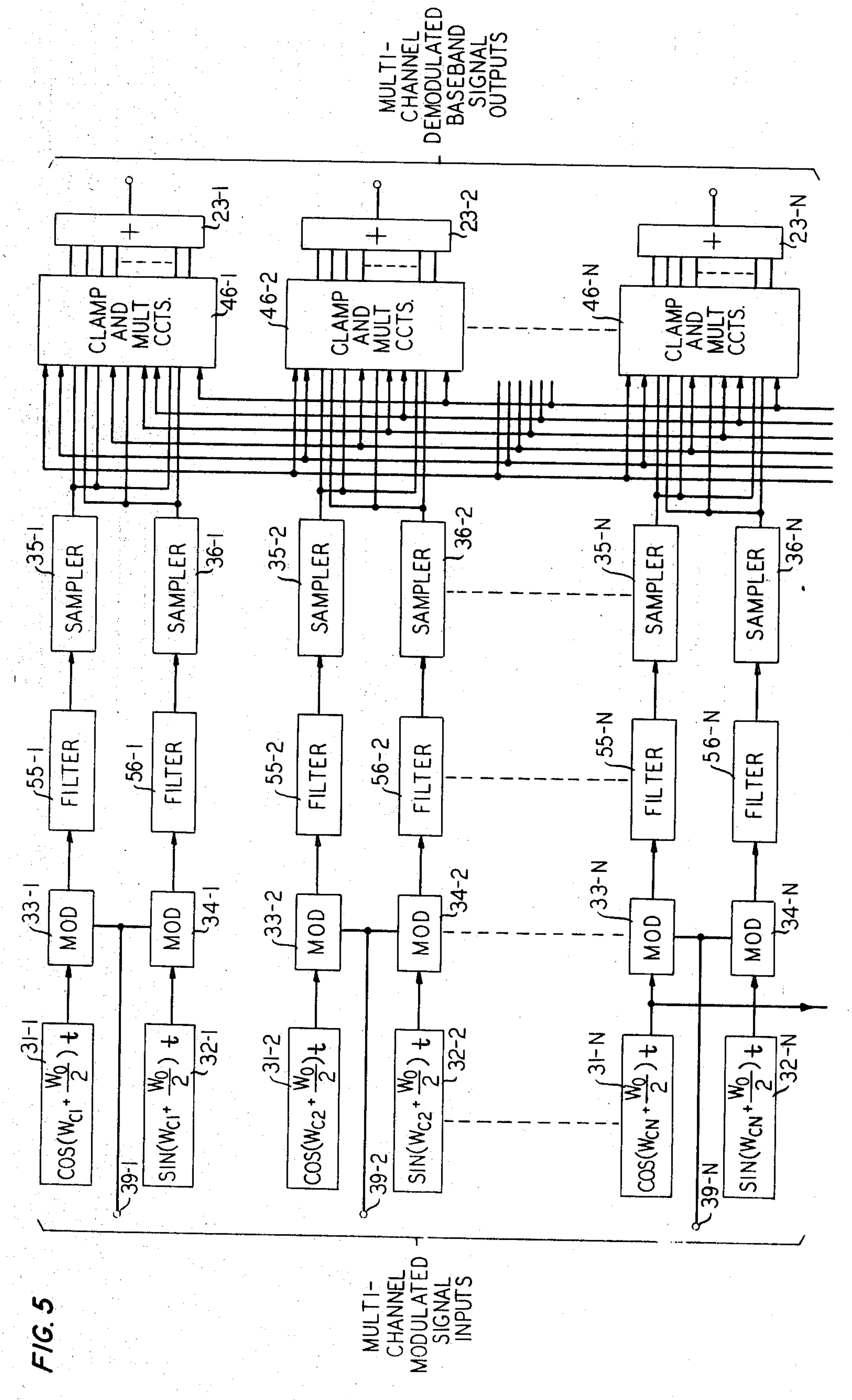
FIGS. 5 and 6 illustrate a multichannel demodulation system employing the teachings of this invention.
Figure 7:
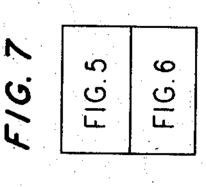
FIG. 7 depicts the relationship between FIGS. 5 and 6.
Figure 6:
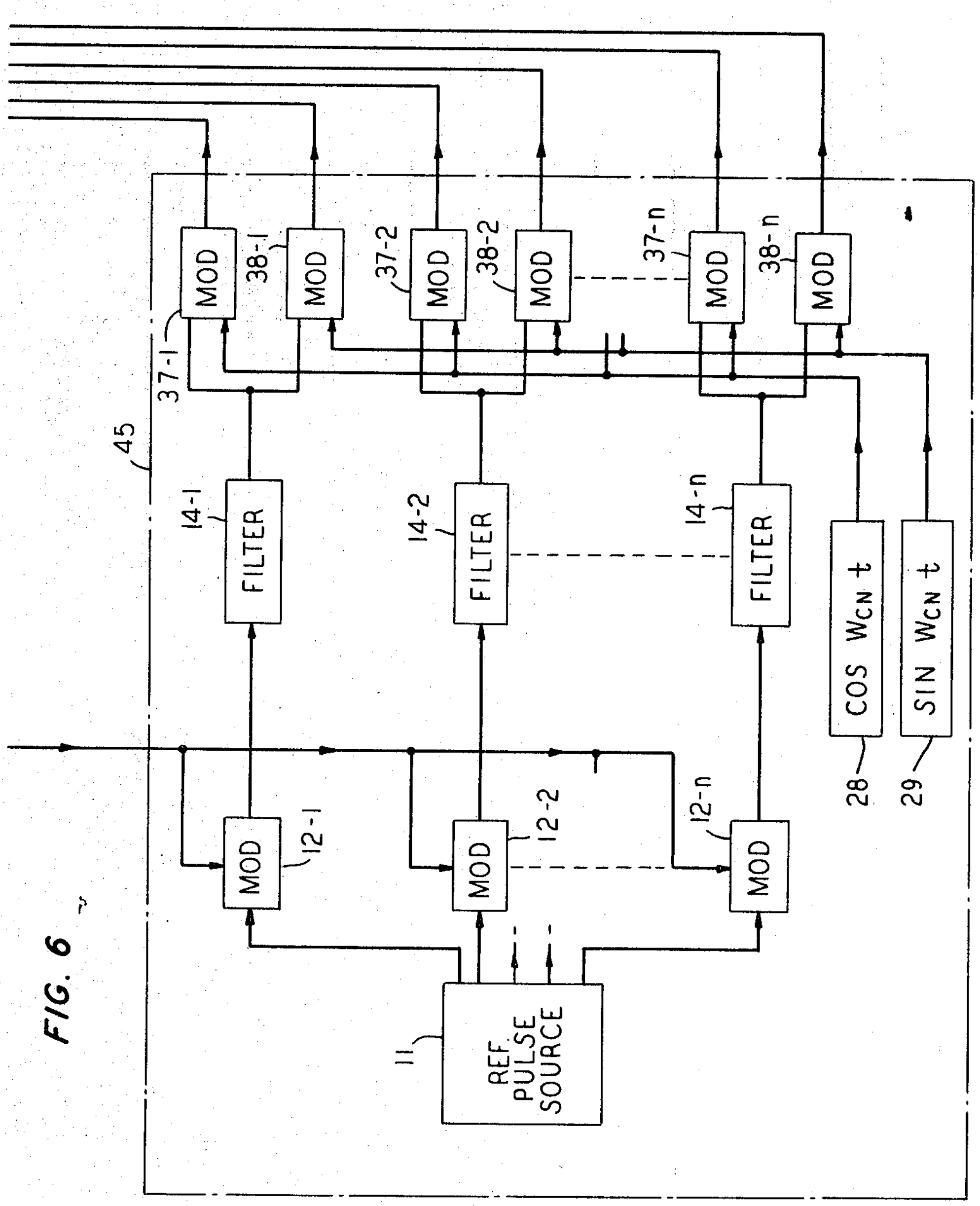

FIGS. 5 and 6 depict a multichannel system wherein a plurality, N, of modulated signal inputs are demodulated to develop a corresponding plurality, N, of baseband counterpart signals. As in the case of the modulation apparatus previously disclosed, since the reference time functions $S_{cO}$ ($t$and $S_{sO}(t)$ developed by the apparatus of FIG. 4 are generic functions, they may be used simultaneously for more than one channel. Samples appearing at the same time on any or all of the N channels require the same reference time function; accordingly, only the modulation and sampling apparatus of each channel and the clamp and multiplication circuit configurations 46 need be duplicated. The components of apparatus 46–1 to 46–N are identical to the components 41, 42, 43 and 44 of apparatus 46 of FIG. 4. The reference time function generating apparatus 45 is likewise identical to that shown in FIG. 4.

As in FIG. 4, a plurality of pulse trains, emanating from source 11, are applied to a plurality of modulators 12 and filters 14 and the resultant filtered signals are modulated by apparatus 37 and 38 to develop a plurality of pairs of reference time functions $S_{cO}(t)$ and $S_{sO}(t)$. The modulating signals applied to apparatus 12, 37 and 38 need not be the same as those depicted as long as they are functions of the same carrier frequency. Each of these reference time functions is applied to a corresponding multiplier circuit 43 or 44 in each of the clamp-multiplication circuit configurations 46. Each of the applied modulated signal inputs at terminals 39–1 through 39–N are demodulated in apparatus 33 and 34 by the indicated sinusoidal functions of the carrier frequency of each received channel signal. The demodulated signals are filtered, if necessary, by apparatus 55 or 56, sampled by apparatus 35 or 36, and the resultant sample pulses applied to one of the clamp-multiplication circuit configurations 46. Thus, the operation of the apparatus under discussion, on a per channel basis, is identical to the operation described and illustrated by FIG. 4. The individual signals emanating from each of the circuit configurations 46 are combined in an associated adder circuit 23–1 through 23–N to develop a plurality of demodulated signals. Again, timing apparatus has not been shown in order to avoid undue confusion.

It is to be understood that the embodiments shown and described herein are illustrative of the principles of this invention only, and that modifications of this invention may be implemented by those skilled in the art without departing from the scope and spirit of the invention; for example, reference time function generating apparatus may comprise memory devices. In particular, a hybrid computer may be used in which reference time functions are stored as tables of numbers in a digital memory, but are converted to analogue signals for multiplication by samples of the applied signal. Alternatively, reference time functions signals may be stored as sets of precision voltages which are switched to appropriate multipliers at relevant times. Furthermore, magnetically recorded analogue reference signals may be utilized; by using a multiplicity of reading heads with a magnetic drum a plurality of time shifted reference signals may be generated.

I claim:

1. Modulation apparatus comprising:
a source of reference pulses;
means for multiplying said reference pulses and an applied carrier signal of predetermined frequency to develop product signals;
means for filtering said product signals to develop reference time function signals;
means for periodically developing signals proportional to the amplitude of an applied baseband signal; and
means for multiplying said reference time function signals and said proportional signals to develop a single-sideband modulated signal.

2. Modulation apparatus comprising:
a source of a train of pulses of constant amplitude;
means for forming a product signal of said train of pulses and an applied carrier signal of predetermined frequency;
means for filtering said product signal to develop a reference time function signal;
means for sampling an applied baseband signal to develop sample pulses having amplitudes corresponding to the instantaneous value of said applied baseband signal;
means for altering the amplitude of said sample pulses in accordance with a predetermined reference value;

means for storing a signal proportional to the altered amplitude of said sample pulses; and means for forming the product of said reference time function signal and said stored signal to develop a single-sideband modulated signal counterpart of said applied baseband signal.

3. Modulation apparatus responsive t an applied signal comprising:

A source of a train of reference pulses;

means for forming a product signal of said train of pulses and an applied carrier signal of predetermined frequency;

means for filtering said product signal to develop a reference time function signal;

means for periodically developing scaling signals having an amplitude proportional to the instantaneous value of said applied signal;

and means for forming the product of said reference time function signal and said scaling signals to develop a single-sideband modulated signal counterpart of said applied signal.

4. A modulation system comprising:

means for generating a plurality of trains of reference pulses;

a plurality of circuit path means, each responsive to one of said plurality of trains of pulses, each of said circuit path means further comprising means for modulating one of said train of pulses with an applied carrier signal and means for filtering said modulated train of pulses to develop a reference time function;

means responsive to an applied baseband signal for developing sample pulses of said baseband signal;

means for storing said sample pulses for a predetermined interval of time; and means for multiplying said stored sample pulses and said reference time functions to develop single-sideband modulated signal components.

5. The modulation system defined in claim 4 wherein said system further comprises:

a plurality of channels conveying baseband signals;

sampling means in each of said channels for developing sample pulses of said baseband signals;

a plurality of means for storing said sample pulses for a predetermined interval of time; and a plurality of multiplication means for forming product signals of said reference time functions and said stored sample pulses.

6. A modulation system comprising:

means for generating a plurality of reference pulses;

a plurality of circuit paths responsive to said reference pulses, said circuit paths further comprising means for modulating said reference pulses with an applied carrier signal and means for filtering said modulated pulses to develop reference time function signals;

means responsive to an applied baseband signal for developing sample pulses of said baseband signals; and means for selectively multiplying said sample pulses and said reference time function signals.

7. The modulation system defined in claim 6 wherein said system further comprises:

a plurality of channels conveying baseband signals;

sampling means in each of said channels for developing sample pulses of said baseband signals; and a plurality of means for selectively forming product signals of said reference time function signals and said sample pulses.

8. Demodulation apparatus comprising:

means for generating a plurality of trains of reference pulses;

a plurality of circuit path means, each responsive to one of said plurality of pulse trains, and each comprising multiplying means for forming a product signal of one of said pulse trains with a sinusoidal wave of a predetermined frequency and means for filtering said product signal, each of said circuit path means further comprising a pair of means for modulating said filtered product signal with predetermined sinusoidal functions to develop reference time function signals;

a pair of circuit means responsive to an applied sigle-sideband modulated signal, each of said circuit means comprising means for modulating said single-sideband signal with a predetermined sinusoidal function, means for filtering said modulated single-sideband signal, and means for developing sample pulses of said filtered modulated signal;

means for storing said sample pulses for a predetermined interval of time;

means for multiplying said stored sample pulses and said reference time function signals; and means for combining said multiplied pulses an reference signals to develop a baseband demodulated signal counterpart of said applied single-sideband modulated signal.

9. Demodulation apparatus comprising:

means for generating a plurality of reference pulses;

a plurality of circuit path means responsive to said reference pulses comprising means for forming product signals of said reference pulses with applied sinusoidal waves of a predetermined frequency and means for filtering said product signals, each of said circuit path means further comprising means for forming a product of said filtered product signals and predetermined applied sinusoidal waves to develop reference time function signals;

a pair of modulation means responsive to an applied single-sideband modulated signal for forming a pair of demodulated product signals of said single-sideband signal and predetermined applied sinusoidal waves;

means for developing sample pulses of each of said demodulated product signals;

means for multiplying said sample pulses and said reference time function signals; and means for combining said multiplied signals.

10. The demodulation apparatus defined in claim 9 wherein said apparatus further comprises:

a plurality of channels each conveying single-sideband modulated signals;

a pair of modulation means connected in each of said channels for forming a pair of product signals of one of said single-sideband modulated signals and predetermined applied sinusoidal waves;

means connected in each of said channels for developing sample pulses of each of said pair of product signals;

a plurality of means for selectively multiplying said reference time function signals and said sample pulses; and means for combining said multiplied signals to develop a plurality of baseband demodulated single-sideband signal counterparts of said single-sideband modulated signals.

11. Apparatus for developing a demodulated baseband signal counterpart of an applied single-sideband modulated signal input comprising:

means for generating a train of reference pulses;

means for multiplying said train of pulses with a sinusoidal wave of a predetermined frequency;

means for filtering said multiplied train of pulses to remove undesired signal components;

means for multiplying said filtered multiplied train of pulses with a pair of sinusoidal waves of a predetermined frequency to develop reference time function signals;

means for multiplying said applied single-sideband modulated signal with a pair of sinusoidal waves of a predetermined frequency;

means for developing scaling signals at predetermined periodic intervals having amplitudes corresponding to the magnitude of said multiplied single-sideband signals; and means for multiplying said reference time function signals and said scaling signals.

12. The method of developing a demodulated baseband signal counterpart of an applied single-sideband modulated signal input comprising the steps of:

generating a train of pulses having a predetermined amplitude;

multiplying said train of pulses with a sinusoidal wave of a predetermined frequency;

filtering said multiplied train of pulses to remove undesired signal components;

multiplying said filtered multiplied train of pulses with a pair of sinusoidal waves of a predetermined frequency to develop reference time function signals;

multiplying said applied single-sideband modulated signal with a pair of sinusoidal waves of a predetermined frequency;

developing scaling signals at predetermined periodic intervals having amplitudes corresponding to the magnitude of said multiplied single-sideband signal; and multiplying said reference time function signals and said scaling signals.

13. The method of developing a single-sideband modulated signal counterpart of an applied baseband signal input comprising the steps of:

generating a train of pulses having a predetermined amplitude;

multiplying said train of pulses with a sinusoidal wave of a predetermined frequency;

filtering said multiplied train of pulses to remove undesired signal components;

developing scaling signals at predetermined periodic intervals having amplitudes corresponding to the magnitude of said applied baseband signal; and multiplying said filtered multiplied train of pulses and said scaling signals.

14 The method of developing a single-sideband modulated signal from an applied baseband signal input comprising the steps of:

developing a reference time function signal from a carrier signal;

developing scaling signals at predetermined periodic intervals having amplitudes corresponding to the magnitude of said applied baseband signal; and multiplying said reference time function signal and said scaling signals.

15. The method of developing a demodulated baseband signal from an applied single-sideband modulated signal input comprising the steps of:

developing a reference time function signal from a carrier signal;

multiplying said applied single-sideband modulated signal with a pair of sinusoidal waves of a predetermined frequency;

developing scaling signals at predetermined periodic intervals having amplitude corresponding to the magnitude of said multiplied applied single-sideband signal; and multiplying said reference time function signal and said scaling signals.